July 3, 1962  C. E. REESBY  3,041,875
SURFACE RECORDING DRILL STEM TESTING COMBINATION
Filed Sept. 30, 1957  3 Sheets-Sheet 1

INVENTOR.
CARL E. REESBY,
BY James M. Pepper
AGENT.

July 3, 1962
C. E. REESBY
3,041,875
SURFACE RECORDING DRILL STEM TESTING COMBINATION
Filed Sept. 30, 1957
3 Sheets-Sheet 2
FIG. 5.
FIG. 6.
FIG. 8.
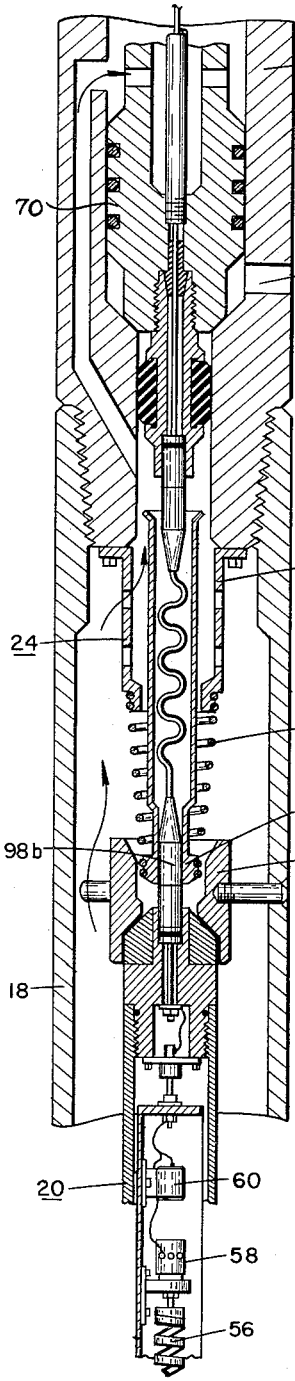
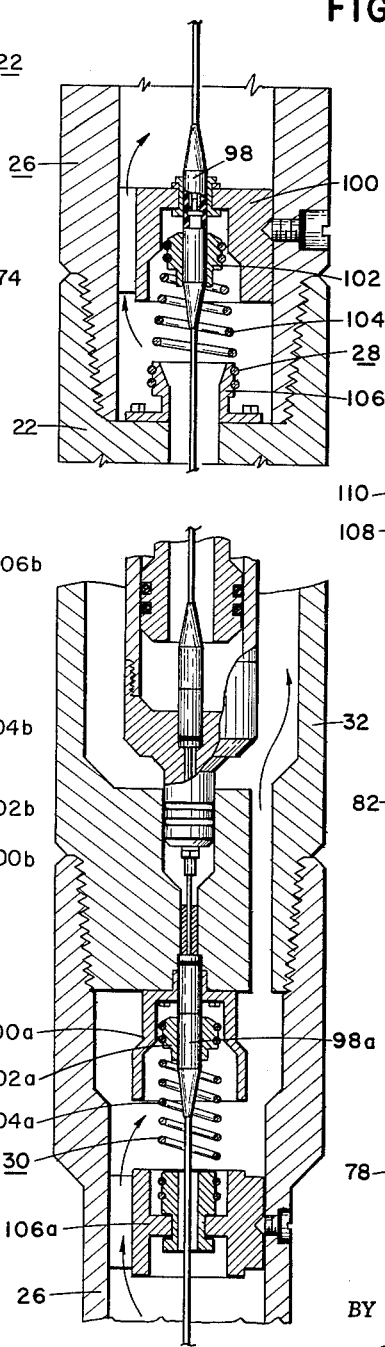
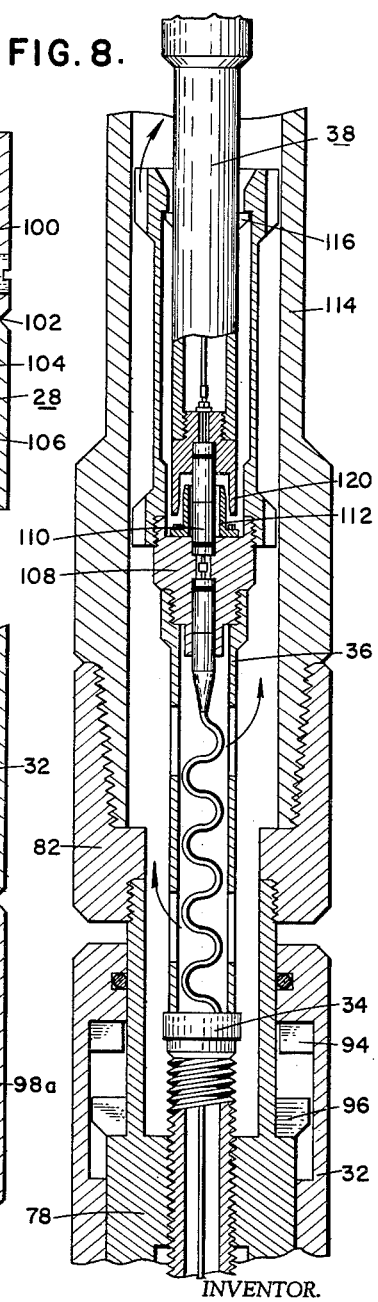
FIG. 7.
INVENTOR.
CARL E. REESBY,
BY James M. Peppers
AGENT.

July 3, 1962　　　C. E. REESBY　　　3,041,875
SURFACE RECORDING DRILL STEM TESTING COMBINATION
Filed Sept. 30, 1957　　　3 Sheets-Sheet 3

INVENTOR.
CARL E. REESBY,
BY James M. Peppers
AGENT.

United States Patent Office 3,041,875
Patented July 3, 1962

3,041,875
SURFACE RECORDING DRILL STEM TESTING COMBINATION
Carl E. Reesby, Houston, Tex., assignor, by mesne assignments, to Halliburton Company, a corporation of Delaware
Filed Sept. 30, 1957, Ser. No. 686,905
5 Claims. (Cl. 73—155)

This invention generally relates to means of testing well bore formations for oil productivity and more particularly relates to drill stem testing apparatus featuring means for concurrent surface indication of the characteristics measured.

Generally the testing of oil wells is a highly developed art and records made of the pressure variations of the formation during conduction of such tests are of quantitative value in the determination of well productivity and reservoir evaluation.

As presently conducted, these tests are generally made by isolating a particular section of well formation and allowing fluid to flow from said formation up through a drill pipe to the earth's surface. At least one valve is provided within the drill pipe to allow initiation and termination of such flow. One or more self contained recording sensing elements are usually provided adjacent to said formation to record the various characteristics produced over a predetermined time, both when the formation is allowed to produce freely and when the formation flow is halted.

At present the testing apparatus is assembled and lowered into the well bore from a drill stem, joint by joint, to the level where the test is to be conducted. The previously mentioned sensing elements are continuously recording at this time. After the packers have been set and tester valve opened the only knowledge immediately known at the earth's surface is that the packer mechanism has functioned and that the tester valve has been opened. Malfunctions, such as when the tester valve and attendant chokes has been plugged by cuttings or sand, or when well casing perforations have been plugged by unconsolidated sand, are not always discernable at the earth's surface. The operator, after opening and setting the testing apparatus, allows the valve to remain open for a period determined only arbitrarily and by estimate. When further manipulation is desired, such as taking the closed in pressure, such period is also determined by estimate. Such estimated periods are oftentimes too long or inadequate.

Knowledge of the actual pressures, temperatures, or fluid resistivity encountered during the test is not available to the operator until the testing apparatus has been withdrawn from the well, joint by joint, and the sensing elements removed from the testing apparatus for inspection. This insertion and removal of the testing apparatus from the well bore takes several hours of valuable rig time. If the test records subsequently removed from the sensing elements prove to be unsatisfactory, such long and arduous procedure may need be repeated.

It is therefore the object of this invention to provide apparatus which may be assembled and inserted into a well bore as conveniently as that presently available and yet provide for concurrent surface indication of characteristics of the tested well formation.

In accordance with the present invention there is provided testing apparatus having a packing means suitable for isolating the desired section of well formation to be tested. A conduit means is provided for communication of fluids from said isolated formation to the earth's surface. A tester valve is provided in connection with said conduit near said packing means to effect initiation and termination of fluid flow from said formation through said conduit. A formation characteristic sensing element, which is provided in communication with the well bore adjacent said formation, is adapted to sense any changes in characteristic that may occur. Said sensing element is adapted to produce an electrical signal in direct response to such change in characteristic. Said conduit, said tester valve, and said packing means are adapted to be assembled by rotating threaded connection. An electrical connection landing means is provided in said conduit adjacent to said tester valve and between said tester valve and the earth's surface. Said sensing means has electrical communication through said tester valve to said landing means by means of electrical connection through said tester valve featuring an electrical connector having a first resilient support supported in axial alignment with a second rigid support also in axial alignment with said first resilient support and having guiding means to center said first support to effect rotatable connection of a first and second complementary portion of an insulated connector upon threaded assembly of said tester valve into said testing apparatus. A traveling electrical connection means, attached to an electrical conductor hoisting cable, is provided to be lowered through said conduit into rotatable electrical engagement with said landing means. Upon engagement, said traveling connection means is supported against removal from said landing means by any forces upon said traveling means other than a tensional force of predetermined magnitude from said cable. Indicating means is provided at the earth's surface in electrical connection with said cable to indicate the electrical signals provided by said sensing means.

Other objects and advantages will appear from the further description and claims of the invention taken in conjunction with the drawing in which:

FIGURES 1, 2, 3, and 4 illustrate, partially in cross section, an elevation of the well formation testing tool during the flowing cycle of a testing operation.

FIGURE 5 is a longitudinal cross section showing the electrical connector between the sensing means and the tester valve in detail.

FIGURE 6 is a longitudinal cross section illustrating the electrical connector between the tester valve and a sample chamber in detail.

FIGURE 7 is a longitudinal cross section illustrating the electrical connector between the upper section of the sample chamber and the lower section of a two-way circulating valve in detail.

FIGURE 8 is a longitudinal cross section illustrating the connection between the upper portion of said circulating valve and an electrical connection landing sub with an electrical connection tool in engaged position.

Figure 13:
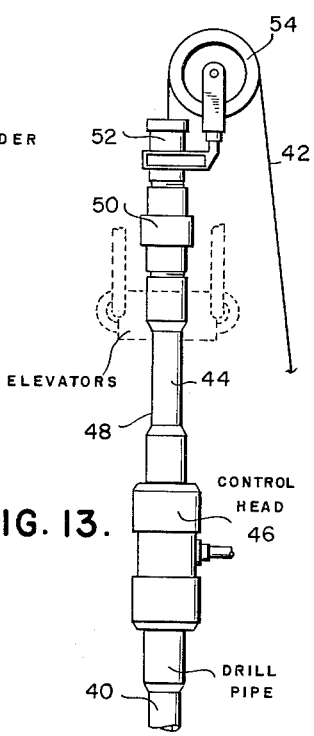

FIGURE 13 generally illustrates a control head and packing apparatus adapted to pass the connection tool and suspending cable down to the landing sub.

Now referring to FIGURES 1, 2, 3, and 4, it is seen that each figure successively illustrates a connected section of an assembled testing apparatus as immersed in a well bore 10. The conduit 40 illustrated in FIGURE 4 may extend several thousand feet to the earth's surface for connection to the control assembly illustrated in FIGURE 13.

Figure 1:
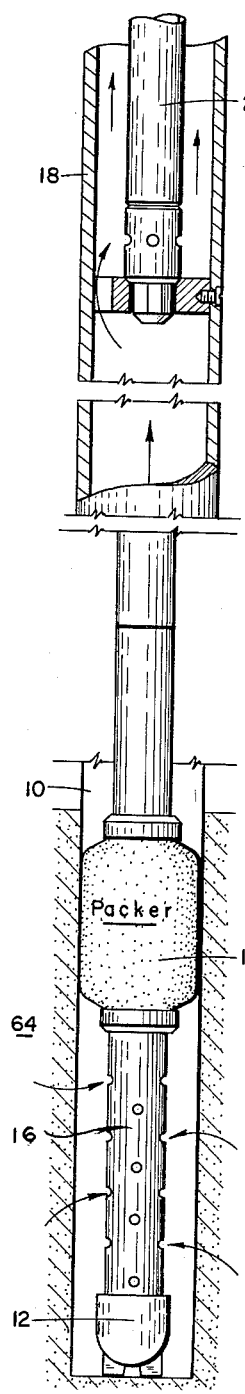

As shown in FIGURE 1, an anchor shoe 12 and a perforated anchor pipe 16 is provided to support a packer 14. Packer 14 is expanded into sealing contact with well bore 10 upon application of the weight of the previously mentioned conduit. The expanded packer 14 prevents the drilling mud in well bore 10 above said packer from entering the section being tested below said packer. Thus, the quantity, quality, and pressures of the fluids from the isolated section of formation are the only obtained within the testing assembly. The isolated section of well formation to be tested is designated at 64.

Connected above packer 14 is a housing 18 containing a characteristic sensing and electrical transmitting element 20. Element 20 is connected into valve 22 by means of a later described electrical connector 24.

Tester valve 22 is connected at its upper end to a sample chamber 26 which has electrical communication therethrough terminating in a connector 28 to valve 22 at its lower end and a connector 30 to a two-way circulating valve 32 at its upper end.

Valve 32 also has electrical communication therethrough. Supported from an inner valve mandrel 34 of circulating valve 32 is the electrical connection landing sub 36, said sub being adapted to engage an electrical connection tool 38. The upper end of circulating valve 32 is connected to conduit 40 which extends, possibly for several thousand feet, to the surface of the earth.

Connection tool 38 is adapted to be lowered through conduit 40 into engagement with landing sub 36 by means of an electrical conductor hoisting cable 42. Cable 42 is herein provided of single conductor, the sheath thereof serving as a return.

Referring to FIGURE 13, it is seen that the cable 42 is suspended into conduit 40 through a control assembly 44. As provided, control valve 46 is attached to the upper end of conduit 40. A lifting sub 48, a swivel 50 and a packing gland 52 are successively connected above valve 46. A sheave 54, attached to the top of the assembly 44, is provided to direct cable 42 from the assembly to a hoisting and recording unit (not shown).

When the tester assembly is connected as shown in FIGURES 1, 2, 3, and 4, continuous insulated electrical connection is effected from the sensing element 20 to the landing sub 36 by means of connectors 24, 28, and 30. Effective engagement of connection tool 38 into landing sub 36 then completes such electrical connection through cable 42 into the recording unit at the earth's surface.

Figure 10:
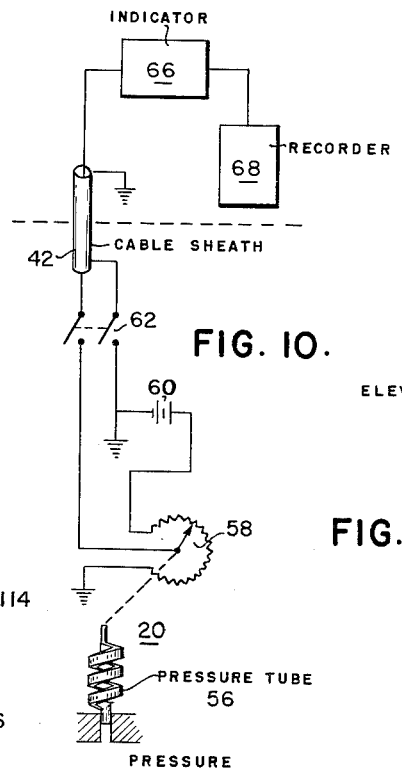
FIGURE 10 is a schematic illustration of the electrical circuit provided in the present invention.
Figure 11:
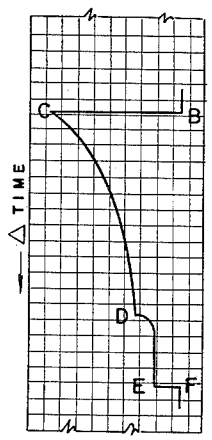
FIGURE 11 is a record provided of the test of a highly productive formation by the present invention.
Figure 12:
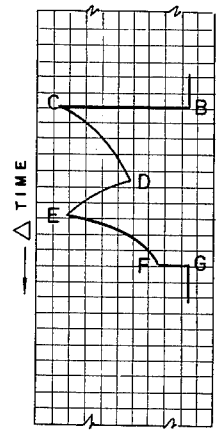
FIGURE 12 is a record illustrating the test of a productive formation where a column of water is provided in the conduit above the tester valve.

Representation of such circuit is illustrated in FIGURE 10. Contained within the sensing element 20 is a sensing device 56, herein exampled as a pressure responsive Bourdon tube, mechanically coupled to the tap of a potentiometer 58. Electrical current is adapted to be provided through potentiometer 58 by a battery 60 upon completion of a continuous circuit provided from one terminal of battery 60 to a terminal of potentiometer 58, the other terminal of which is attached to the opposing terminal of battery 60 through a common ground. A switch 62, shown in FIGURE 10, schematically illustrates the electrical connection provided by engagement of connection tool 38 into landing sub 36. Thus, complete engagement of tool 38 connects the tap of potentiometer 58 through the conductor of cable 42 to indicator 66 and recorder 68 at the earth's surface. Any change in tap position of potentiometer 58 responsive to change in characteristic at sensing element 56 will be instantly reflected at the earth's surface for indication and recordation. Thus, an attending operator will concurrently know the condition at sensing element 20. As later described, the chart records illustrated in FIGURES 11 and 12 are responsive to such conditions.

It is seen that this knowledge will enable the operator to detect malfunctions and determine optimum periods for each cycle of the testing operation.

Figure 2:
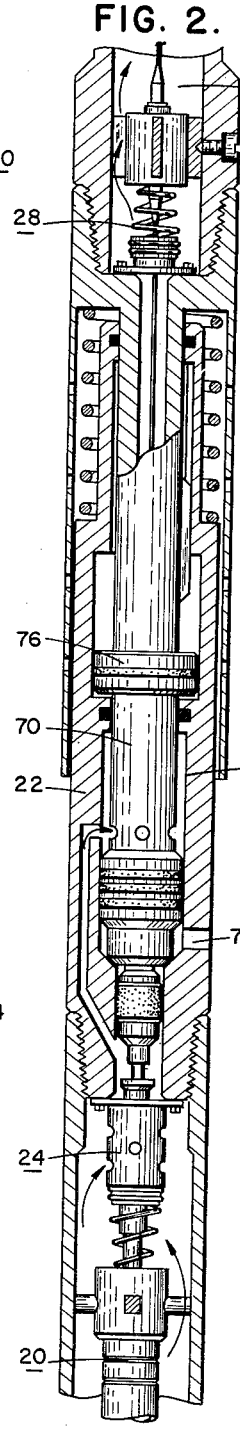

Tester valve 22, shown in FIGURE 2, generally consists of a hollow inner mandrel 70 reciprocatively positioned within a cylinder 72. As provided, fluid communication is provided through the entire valve 22 upon the mandrel 70 being in telescoped position. When in extended position the lower end of valve 22 is in communication with fluids outside the valve through a port 74. A hydraulic metering system is provided at 76 to selectively limit the telescoping rate of mandrel 70 within cylinder 72. For further description of such a tester valve, reference may be had to Patent No. 2,740,479 to Schwegman. Though the present tester valve has been found particularly suitable, it also pointed out that other types of tester valves may be used as this element of the instant invention with equal utility.

Figure 3:
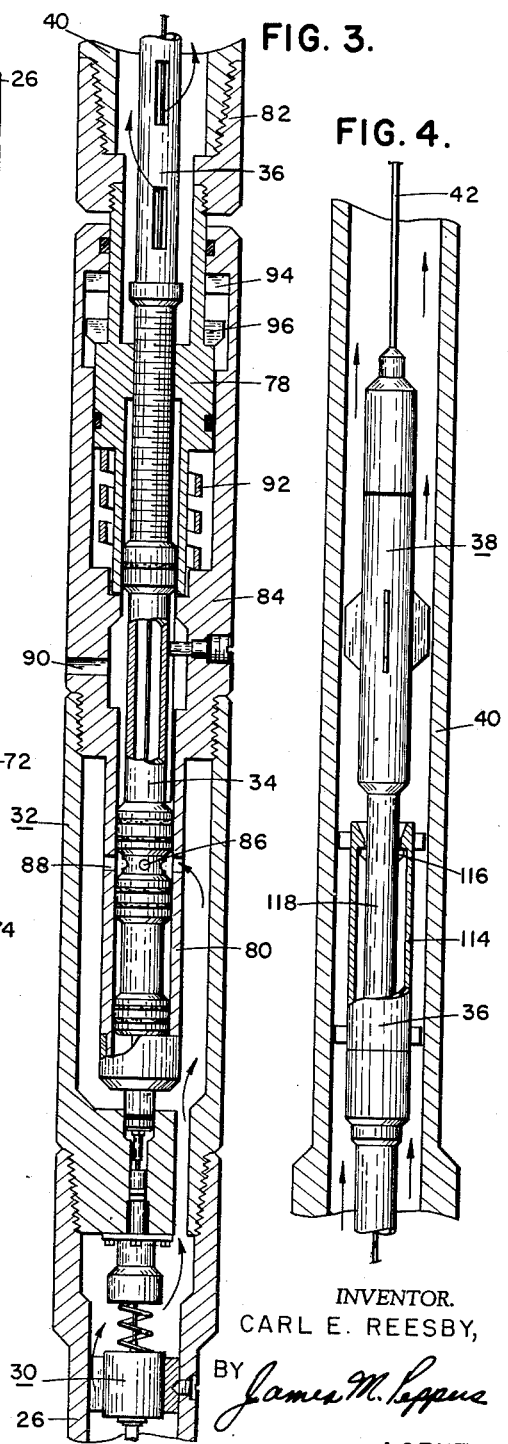
Figure 4:
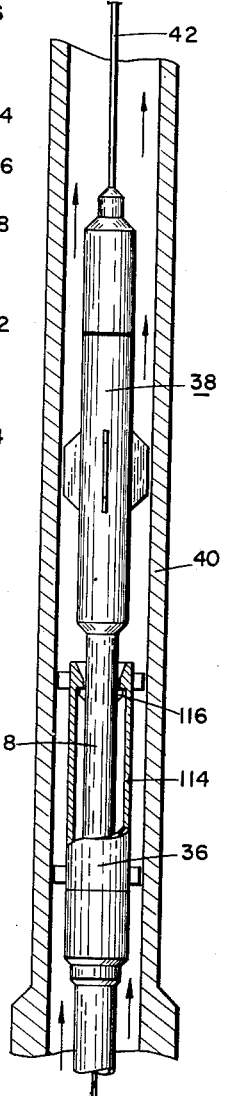

Circulating valve 32, shown in FIGURE 3, primarily consists of an inner valve mandrel 34 adapted to reciprocative movement in an inner cylinder 80. As provided, rotation of an upper housing 82 relative to the lower housing 84 reciprocates valve mandrel 34 within inner cylinder 80. Valve mandrel 34 has ports 86 which are adapted for communication with ports 88 of inner cylinder 80 upon mandrel 34 being telescoped into a first position. Upon rotation of the upper housing 82 with respect to lower housing 84, ten turns for example, ports 86 are moved up within inner cylinder 80 to an intermediate point of closed off fluid communication. Additional rotation of upper housing 82, for example ten turns, moves mandrel ports 86 into communication with ports 90 in the wall of lower housing 84. The interior of mandrel 78 is then in communication to the well fluids outside circulating valve 32.

As provided, circulating valve 32, when in the first position as previously described, provides communication from sample chamber 26 into fluid conduit 40, and thence to the earth's surface. Upon ten additional turns rotation of upper housing 82 relative to lower housing 84, valve 32 closes off such communication. Subsequent rotation of upper housing 82 then registers ports 86 and 90, providing communication from the surrounding annulus into conduit 40. Fluids pumped down the annulus may then be circulated back up through the interior of conduit 40 when desired.

A feature provided in the embodiment of circulating valve 32 as herein illustrated is a spring 92, provided intermediate a shoulder of valve mandrel 78 and a shoulder of lower housing 84, which supports mandrel 78 at an extended position in the absence of external compressional force. When extended, rotation between upper housing 82 and lower housing 84 is prevented by lugs 94 and 96, respectively mounted to such housings. Upon compression in response to weight applied by conduit 40, the lugs 94 and 96 become disengaged and the inner mandrel is telescoped into the open position indicated in FIGURE 3. Subsequent rotation then moves mandrel 34 through the various positions previously described.

Illustrated at 24 in FIGURES 2 and 5, 28 in FIGURES 2 and 6, and 30 in FIGURES 3 and 7 are somewhat alternate embodiments of an improved electrical connector provided by the invention. In each a watertight and rotatable electrical connector is provided, such as manufactured by the Joy Manufacturing Company. As shown in FIGURE 6, the first half of a connector 98 is supported in axial relation to the housing in which it is mounted by means of a recessed centering and supporting means 100. Supporting and centering the complementary half of connector 98 into engaged position is a resilient support formed by a collar 102, a spring 104 and a support member 106. As provided, spring 104 is adapted to be attached to collar 102 and support 106 by threaded engagement. Support 106 is fastened to the upper portion of tester valve 22.

In FIGURE 7, support 100a is fastened to the lower portion of circulating valve 32 and support 106a is fastened into the upper end of sample chamber 26. In FIGURE 5, support 100b is supported with housing 18 and support 106*b* is attached to the lower end of tester valve 22. Sensing element 20 is also supported by support 100*b*.

In FIGURE 5, collar 102*b* is provided with extending skirt which extends inside spring 104*b* into the lower passage of tester valve 22. It is also seen that support 106*b* is somewhat elongated and provided with fluid entry ports in the walls thereof. This embodiment is provided to prevent impingement of the fluids passing from housing 18 through the tester valve 22, often entraining drilling cuttings and sand, on the conductor extending from connector 98*b* through tester 22. Provided for the same purpose within the hollow valve mandrel 70 is an additional protective conduit about said conductor. As seen in FIGURE 5, threaded connection of tester 22 to housing 18 will center and engage the electrical connector 98*b* without further exterior effort or inspection. Threaded connection of sample chamber 26 and the upper end of tester valve 22, FIGURE 6, will effect identical connection at connector 28. Threaded connection of the upper end of sample chamber 26 to circulating valve 32, FIGURE 7, also effects ready and reliable electrical connection.

It is thus seen that assembly of the various elements as illustrated in FIGURES 1, 2, 3, and 4 not only readies the tester assembly for a testing operation, but provides instant and reliable insulated electrical communication from sensing element 20 to the electrical connecting landing sub 36.

As illustrated in FIGURE 8, landing sub 36 is attached to the top of and extends upwardly from the inner valve mandrel 34 of circulating valve 32. The electrical conductor extending through mandrel 34 terminates in a landing block 108. A first half of a connector 110, of the type previously described, is supported in block 108. A landing guide 112 extends upwardly and surrounds this half of connector 110. Surounding guide 112 and extending upwardly therefrom is a landing collar 114, terminating at its upper end in an internal latching buttress. The interior of landing collar 114 is tapered outwardly at its upper end toward the inner walls of conduit 40 to facilitate reception of connection tool 38 into engagement.

Figure 9:
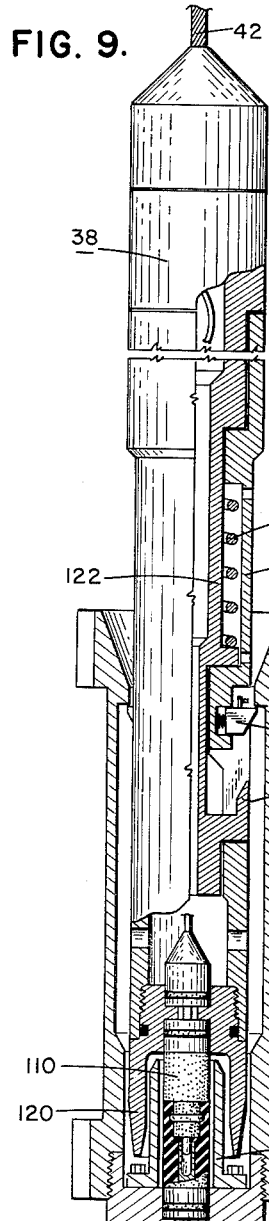
FIGURE 9 is a longitudinal cross section illustrating the electrical connection tool latching mechanism in detail.

FIGURE 9 illustrates connection tool 38 in greater detail. As illustrated, connection tool 38 is latched in engaged position and the complementary halves of connector 110 are in electrical continuity. When so engaged a spring loaded pawl 116, supported in the body 118 of connection tool 38, is engaged with the internal buttress of landing collar 114, preventing longitudinal movement of tool 38 relative to landing block 108. When so engaged, a landing lip 120 has telescoped over landing guide 112 for protecting and centering the complementary halves of connector 110 during engagement.

Body 118 of tool 38 has reciprocally mounted therein a releasing mandrel 122, spring loaded by spring 124 into a lower position relative to body 118. Attached to mandrel 122 are tripping lugs 126, each having upwardly facing inclined surfaces adapted to complement lower inclined surfaces provided on latching pawl 116. Upward travel of mandrel 122 relative to body 118 engages tripping lugs 126 with latching pawls 116, thereby withdrawing said pawls within the body 118.

It is seen that the force to raise mandrel 122 within the body 118 is governed by the compressional strength of spring 124. It is further seen that when such spring is compressed by tension in the line 42, that the connection tool 38 will be released from the landing collar 114 upon disengagement of the latching pawls 116. As provided, the compressional strength of spring 124 is such that a tension of from 500 to 1,000 lbs. is required to bring tripping lugs 126 into disengaging connection with latching pawls 116. Upon such tension being exerted, connection tool 38 is unlatched and rapidly withdrawn from the landing sub 36.

In operation the entire testing assembly, as shown in FIGURES 1, 2, 3, and 4 is assembled at the surface, connected to the bottom of conduit 40 and lowered to the bottom of the well bore upon addition of successive joints of conduit 40.

Upon being placed upon bottom, but before packer 14 is set, the control assembly 44 is connected to the top of the conduit 40 with connection tool 38 within conduit 40. Connection tool 38 is then lowered, oftentimes several thousand feet, into latching engagement with the electrical connection landing sub 36. The indicator 66 will then indicate a tap position of potentiometer 58 representative of the hydrostatic fluid pressure found at the level of the sensing element 20.

Additional weight is applied to the testing assembly by the conduit 40, pressing the packer into sealing engagement with the walls of the well bore 10. Shortly after such sealing engagement is made, the tester valve 22, responsive to such applied weight, suddenly opens and allows fluid communication between the interior of conduit 40 and formation 64. The initial open position of circulating valve 32, upon such weight application, provides such open communication.

The pressure at sensing element 20 thereon decreases to that which the formation 64 is capable of producing. Such pressure change is instantly communicated to indicator 66 and recorder 68.

After flow has commenced through the tester valve 22 from formation 64 for a preselected period, the conduit 40 may be rotated a predetermined number of turns, for example ten, closing off that portion of the testing assembly below. The pressure then found in housing 18 and below the packer 14 will be that closed-in pressure normally occurring in formation 64. Subsequent rotation of circulating valve 32, for example ten additional turns, will open that portion of conduit 40 above the ports 90 of valve 32 to the hydrostatic pressure found in the well bore above packer 14. Any oil or any testing fluid which has entered conduit 40 from formation 64 may be brought to the earth's surface by pumping fluid down the annulus between conduit 40 and well bore 10. It is noted however, that that portion of fluid found within sample chamber 26 is still isolated from the well bore fluids.

When desired, the weight applied to the testing assembly may be released by lifting conduit 40 and said assembly from the bottom of well bore 10. Such action first closes tester valve 22 then releases packer 14. Raising of the mandrel 70 within the housing 72 of tester valve 22 provides communication through the port 74 into the previously isolated section below packer 14, equalizing the pressure above and below said packer and facilitating the unseating of said packer.

Now referring to FIGURE 11, there is illustrated a typical record of a test produced by recorder 68 during this operation. As shown, the pressure indicated at B is the hydrostatic pressure found in well bore 10 prior to the setting of packer 14 and opening of tester valve 22. Upon the opening of valve 22, the pressure abruptly drops to an initial formation pressure, indicated at C. Continued flow from the formation 64 permits a gradual rise in pressure as indicated by the curve C—D. Point D indicates the point that circulating valve 32 is rotated into the closed in position. Curve D—E indicates the closed in pressure build up of the formation 64. Closing of the tester valve 22, which allows fluid passage from above to below the packer 14, is indicated at E—F.

FIGURE 12 represents the testing record of a similarly productive well but with a retarding cushion of water provided in the conduit 40 above tester valve 22. As shown, the sharp pressure drop B—C is similar. But it is seen that the curve C—D indicates a faster rise in pressure during a shorter interval since the water found in the drill pipe in the conduit 40 must be raised above the fluids produced from the formation 64. The curve D—E indicates the decreasing pressure found below the packer 14 as the water is driven out of the conduit 40 at the earth's surface and the conduit becomes filled with lighter oil and gas.

The curve E—F again indicates the closed in pressure upon closing of the circulating valve 32. It is seen that the pressure build up is very rapid due to high productivity of the formation. F—G indicates opening of port 74 of tester valve 22 into the isolated section 64.

It is pointed out that various elements of the illustrated assembly may be substituted by equivalent means without detriment to the utility or operation thereof. For example, packer 14 may be of the hook wall or straddle type rather than the compression type as herein illustrated. Tester valve 22 may be replaced by other equivalent devices as previously mentioned. The circulating valve 32, though of valuable assistance in producing curves illustrated in FIGURES 11 and 12, may be dispensed with on the simplest flow test. In such event the chart obtained would have only the curves B—C, C—D, and E—F shown in FIGURE 11.

It is also pointed out that the sensing element 20, herein exampled as a pressure sensing element, could be provided to sense other characteristics within such isolated section of well formation. For example device 56 could be a temperature sensing element or a fluid resistivity element such as is disclosed in commonly assigned and copending patent application, Serial No. 600,424 to Smith, filed July 27, 1956, now Patent No. 2,922,103.

Also, two or more characteristics may be concurrently indicated at the earth's surface upon provision of a frequency modulated signal system into sensing element 20 such as is disclosed in Patent No. 2,573,133 to Greer.

It is thus seen that while only one embodiment of the invention is shown and described herein, that various changes may be made without departing from the spirit of the invention or the scope of the annexed claims.

That being claimed is:

1. Apparatus for concurrent surface indication of an earth formation characteristic during a drill stem testing operation, comprising means to isolate a formation from other fluids within a well bore, conduit means in connection with said isolating means for communicating fluids from said formations to the earth's surface, and valving means mounted within said conduit near said isolating means for initiating and terminating fluid flow through said conduit, said conduit, said valving means and said isolating means each having threaded connections for assembly, a formation characteristic sensing means mounted with said apparatus in sensing communication with said formation for producing an electrical indication in response to said characteristic, electrical communication means in connection from said sensing means through said valving means including, a resilient support mounted in axial alignment with a first threaded connection and a rigid support mounted in axial alignment with a complementary second threaded connection and with said resilient support, guiding means disposed with said rigid support for centering said resilient support during connection, an insulated fluid tight electrical connector having a first and second complementary portion adapted for relative rotation, said first portion mounted with said resilient support and said second portion mounted with said rigid support for fluid tight insulated electrical connection upon assembly of said first and second threaded connections, a traveling electrical connection means attached to an electrical conductor hoisting cable, an electrical connection landing means in connection with said electrical communication means within said conduit above said valving means for receiving said traveling connection into fluid tight insulated electrical and mechanical engagement including means for supporting said traveling connection means against removal from said landing means by any forces upon said traveling means other than a tensional force of predetermined magnitude applied through said cable, and receiving means at the earth's surface in connection with said cable for receiving the electrical indication produced by said sensing means.

2. Apparatus for concurrent surface indication of an earth formation characteristic during a drill stem testing operation, comprising, means to isolate a formation from other fluids within a well bore, conduit means in connection with said isolating means for communicating fluids from said formations to the earth's surface, valving means mounted within said conduit near said isolating means for initiating and terminating fluid flow through said conduit, said conduit, said valving means and said isolating means each having threaded connection for assembly, a formation characteristic sensing means mounted with said apparatus in sensing communication with said formation for producing an electrical indication in response to said characteristic, electrical communication means for connecting said sensing means through said valving means including, an insulated water tight electrical connector having a first and second complementary portion each adapted for rotating connection, a first flexible supporting means mounted within a first threaded connection with one end extending toward the end of said first connection, a second rigid supporting means mounted within a second threaded connection, a guiding means disposed within said rigid support for centering and axially compressing said flexible support during connection of said threaded connections, said first connector portion mounted with said flexible support and said second portion being mounted with said guiding means for rotatable water tight engagement during said connection, a traveling electrical connection means attached to an electrical conductor hoisting cable, an electrical connection landing means in connection with said electrical communication means within said conduit above said valving means for receiving said traveling connection means into fluid tight insulated electrical and mechanical engagement, and receiver means at the earth's surface in connection with said cable for receiving the electrical indication produced by said sensing means.

3. Apparatus of the type described, comprising, packer means for isolating a formation from other fluids within a well bore, conduit means in connection with said packer means communicating fluids from said formation to the earth's surface, valving means mounted within said conduit near said packer means for initiating and terminating fluid flow through said conduit, said valving means and packer means having mutually engaging threaded connections for assembly by relative rotation thereof, sensing means mounted in sensing communication with said formation producing an electrical indication in response to a characteristic of said formation, means providing electrical communication from said sensing means across said mutually engaging threaded connections and including first and second mutually engaging electrical connector portions, each of said portions having an associated concentric insulator mutually engaging the insulator associated with other of said portions, one of said electrical connector portions and associated insulator associated with each of said threaded connections, whereby relative rotation to assemble said threaded connections bring said portions including said insulators into mutual engagement, a traveling electrical connection means attached to an electrical conductor hoisting cable, an electrical connector landing means in connection with said electrical communication means within said conduit above the threaded connection associated with said valving means receiving said traveling connection into fluid tight insulated electrical and mechanical engagement including means supporting said traveling connection against removal from said landing means by any forces upon said traveling means other than a tensional force supplied through said cable, and receiving means at the earth's surface in connection with said cable receiving the electrical indication induced by said sensing means.

4. Apparatus of the type described, comprising, packer means for isolating a formation from other fluids within a well bore, conduit in connection with said packer means communicating fluids from said formations to the earth's surface, first valving means mounted within said conduit near said packer means for initiating and terminating fluid flow through said conduit, second valving means mounted within said conduit above said first valving means for terminating fluid flow through said conduit and for initiating fluid flow between the interior and exterior of said conduit, said conduit, said valving means and said packer means each having threaded connections for assembly, sensing means mounted in sensing communication with said formation producing an electrical indication in response to a characteristic of said formation, means providing an electrical communication from said sensing means through said valving means to the earth's surface including flexible electrical connectors each having first and second mutually engaging sections adapted for relative rotation, each of said sections comprising an associated insulator portion, said first section and associated insulator portion adapted for respective engagement with the second section and insulator portion associated therewith upon assembly with each of said threaded connections, a traveling electrical connection means attached to an electrical conductor hoisting cable, an electrical connection landing means in connection with said electrical communication means within said conduit above said valving means receiving said traveling connection into electrical and mechanical engagement, and receiving means at the earth's surface in connection with said cable receiving the electrical indication produced by said sensing means.

5. Apparatus of the type described, comprising, packer means for isolating a formation from other fluids within a well bore, conduit in connection with said packer means communicating fluid from said formation to the earth's surface, valving means mounted within said conduit near said packer means initiating and terminating fluid flow through said conduit, said conduit, said valving means and said packer means each having threaded connections for assembly, sensing means mounted in sensing communication with said formation producing an electrical indication in response to a characteristic of said formation, means providing electrical communication from said sensing means through said valving means to the earth's surface including electrical connector means associated with said threaded connections and each having first and second mutually engaging sections adapted for relative rotation, each said section comprising an associated insulator portion, said first section and associated insulator portion adapted for respective engagement with the second section and associated insulator upon assembly of said associated threaded connections, a traveling electrical connection means attached to an electrical conductor hoisting cable, an electrical connection landing means in connection with said electrical communication means within said conduit above said valving means for receiving said traveling connection into electrical and mechanical engagement, and receiving means at the earth's surface in connection with said cable receiving the electrical indication produced by sensing means.

References Cited in the file of this patent

UNITED STATES PATENTS

| | | |
|---|---|---|
| 2,158,569 | Bowen | May 16, 1939 |
| 2,339,274 | Kothny | Jan. 18, 1944 |
| 2,701,960 | Irwin | Feb. 15, 1955 |
| 2,786,351 | Wiley | Mar. 26, 1957 |
| 2,795,397 | Hull et al. | June 11, 1957 |